(No Model.)

J. J. McTIGHE.
ARMATURE COIL FOR DYNAMO ELECTRIC MACHINES.

No. 295,789.                    Patented Mar. 25, 1884.

UNITED STATES PATENT OFFICE.

JAMES J. McTIGHE, OF PITTSBURG, PENNSYLVANIA.

ARMATURE-COIL FOR DYNAMO-ELECTRIC MACHINES.

SPECIFICATION forming part of Letters Patent No. 295,789, dated March 25, 1884.

Application filed October 16, 1883. (No model.)

*To all whom it may concern:*

Be it known that I, JAMES J. McTIGHE, of Pittsburg, in the county of Allegheny and State of Pennsylvania, have invented certain new and useful Improvements in Armature-Coils; and I do hereby declare that the following is a full, clear, and exact description of the invention, which will enable others skilled in the art to which it appertains to make and use the same, reference being had to the accompanying drawings, which form a part of this specification, in which—

Figure 1:
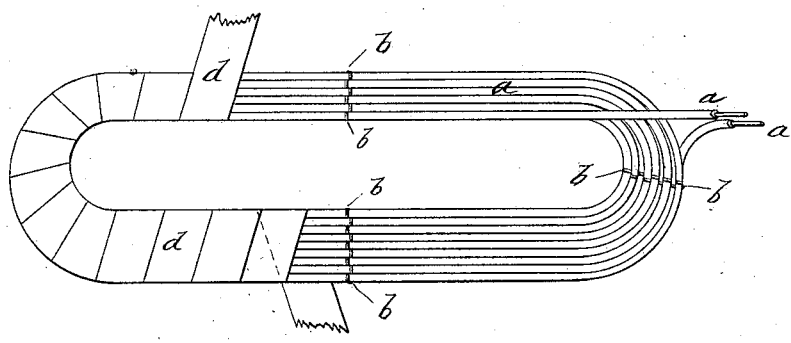
Figure 2:
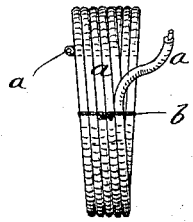

Figure 1 is a side view of my improved form of coil. Fig. 2 is an end view of same.

This invention relates to the construction of armatures for dynamo-electric machines and electric motors, having a special reference to the placing of the wire coils in symmetrical position on the core of the armature.

Heretofore armatures of the continuous-ring type have been made by winding the wire directly on the ring, and again by having the ring made in separate segments and winding the wire thereon. In either of these modes of construction great difficulty is encountered: first, in the necessity of passing the free end of the wire back and forth so frequently; secondly, in placing in each of the coils the same number of convolutions; and, thirdly, in obtaining the perfect insulation of the coil throughout its own structure, and also from the core. It has also been proposed to so construct the armature that the coil could be prepared on a former or mold and then slipped on the armature; but in all cases of which I am aware such prepared coils have been rectangular in cross-section, and thus the surface of the ring could not be entirely utilized or covered with wire.

This invention consists, first, in making prepared coils of a wedge shape in cross-section corresponding to a sector of the armature, and adapted to be placed on an armature; secondly, in the armature-coil of a wedge shape secured by interlacing the convolutions with thread, cord, or other suitable tying device; and, thirdly, in a prepared armature-coil wound exteriorly with an insulating-tape, as hereinafter fully described and claimed.

In the drawings is shown a prepared armature-coil of a wedge shape with the convolutions interlocked by tying, and covered exteriorly by a spirally-wound tape, *a* being the wire, insulated as usual, *b* representing the interlocking cord, and *d* showing the exterior winding of the insulating-tape. In preparing such a coil I take a former or mold whose sides or cheeks converge inwardly, and having slits at the points of tying, which will vary according to the size of the coil; and I first lay the cord *b* transversely at different tying-points and wind one layer of wire. I then cross the ends of the cord, so as to come on top of the said layer. I then proceed to wind the second layer, and so on until the coil is completed, after which the free ends of the cords *b* are tied tightly. On account of the wedge form of the coil, the number of layers, and consequently the number of crossings of the cord, will be greater on the inner or narrow part of the coil than on the outer or thicker portion. When thus laid up in a suitable former or mold and then tied, such a coil may be removed from the mold and will be found to be solid and strong in every way, and have no tendency to warp or twist. The coil is then taken and wound in and out spirally, as shown in Fig. 1, by tape *c*, of any suitable insulating material, and may then be varnished. When dry, the coil is ready for use, and may be placed on any armature capable of such treatment without any danger whatever of cutting or tearing the insulation, or in any way endangering a short circuit in the operation of putting the coils in position, or any subsequent revolution of the armature provided with such coils. By reason of the wedge form, an armature may be, if desired, completely covered with wire in this way.

A further advantage of this mode of constructing an armature is the facility with which both the mechanical balancing of the armature and the electrical equalization of the individual coils may be effected.

I claim as my invention—

1. A prepared armature-coil having a wedge shape in cross-section, and having its layers of wire interlocked by tying, and the whole adapted to be placed on an armature after being completed, substantially as described.

2. A prepared armature-coil, completely covered externally by an insulating band or tape wound spirally thereon, substantially as described.

3. A prepared armature-coil having a wedge shape in cross-section, its layers of wire interlocked by tying, and covered externally with an insulating band or tape wound spirally thereon, substantially as described.

In testimony that I claim the foregoing as my own I have hereto affixed my signature in presence of two witnesses.

JAMES J. McTIGHE.

Witnesses:
T. J. PATTERSON,
D. E. DAVIS.